Patented Nov. 13, 1945

2,388,665

UNITED STATES PATENT OFFICE 2,388,665

DIBENZANTHRONE COMPOUNDS

Ernest George Beckett, Larbert, Scotland, assignor to Imperial Chemical Industries Limited, a corporation of Great Britain No Drawing. Application June 8, 1943,
Serial No. 490,066

8 Claims. (Cl. 260—355)

This invention relates to the preparation of alkylation products of dihydroxydibenzanthrone, and more particularly to a process for purifying these products when prepared by direct alkylation of the dihydroxy compounds.

In the alkylation of $B_r2,B_r2'$-dihydroxydibenzanthrone there is invariably produced with the dialkylation derivative some monoalkylation derivatives, and often there is present in the final product some of the original dihydroxydibenzanthrone that is unreacted. It has been found that the presence of such incompletely alkylated material even in small amounts seriously affects the shade of the dyeings of the dialkoxydibenzanthrones. For example, it has been found that the presence of only 2% of the monohydroxymethoxy-dibenzanthrone causes appreciable blueness and dullness of the dyeings of the dimethoxydibenzanthrone in which it may be present. Heretofore no economical method has been known for removing the non-alkylated or partially alkylated impurities that contaminate the desired dye.

I have now found that the hydroxy-containing impurities of the types above mentioned may be quantitatively removed by treating the crude dialkylation products with caustic alkali in the presence of aqueous solutions or suspensions of heterocyclic nitrogen bases. This treatment renders the free hydroxy-containing dibenzanthrone compound soluble in the alkaline solution, apparently as the sodium salt, whereas the completely dialkylated dihydroxydibenzanthrone remains practically insoluble and may be separated by filtration. The formation of the sodium salt of the hydroxy-containing impurities is promoted by vatting in the presence of caustic alkali and the heterocyclic nitrogen bases. After vatting the dye is oxidized in the normal manner. Separation or purification can also be effected by milling the crude dialkoxy-dibenzanthrone with caustic alkali in the presence of the heterocyclic nitrogen bases and water, although this process does not give as good results as when the salt formation is carried out in a vatting process.

The compounds which have been found suitable as solvents in this operation come under the class of water soluble heterocyclic nitrogenous bases such as pyridine and its homologs and mixtures thereof, polymethylene imines, thiazoles and the like.

The efficiency of the process depends partly on the concentration and on the particular solvent employed. The limits of concentration are defined by poor separation of impurity due to low concentration of solvent on the one hand and needlessly high and uneconomical concentrations on the other hand. The lower limit varies with the amount of impurity to be extracted and upon the particular solvent employed. With the grade of crude dimethoxy-dibenzanthrone usually obtained in technical practice, it has been found that the efficacy of the extraction is somewhat impaired when the solvent concentration drops below from about 25 to 30% in the case of pyridine. Satisfactory operation is obtained with a concentration in the neighborhood of 37.5%. In general, concentrations as high as 50% solvent and 50% water, while very effective, are not necessary.

Vatting may be carried out either by means of sodium hydrosulfite, nascent hydrogen, molecular hydrogen and a catalyst or by other means used in the vatting of vat colors.

As caustic alkali either sodium hydroxide or potassium hydroxide may be used. When sodium hydroxide is used and the vatting is carried out with hydrogen, a minimum of 0.66 part of sodium hydroxide per part of crude dialkoxydibenzanthrone should be employed. The concentration of sodium hydroxide in water should be preferably in the neighborhood of from 2 to 6% or higher. If sodium hydrosulfite is used for vatting, the sodium hydroxide is preferably employed in an amount equal to not less than one part per part of dyestuff, and in a concentration of about 4% NaOH based upon the total liquid.

This solvent extraction of the hydroxy-containing impurities in the dialkoxydibenzanthrones is particularly efficacious when working with compounds that have been alkylated at relatively low temperatures, such as from 60 to 130° C. Although very material and worthwhile purification can also be effected on products that have been produced at the higher alkylation temperatures, apparently some of the impurities produced at the higher alkylation temperatures are converted into higher condensation products which are not as readily extracted as the uncondensed impurities.

Under the conditions of the process, many of the solvents, which are very soluble in water become partially salted out and tend to form two layers. This effect is particularly noticeable in the case of amino-pyridine. This, however, does not interfere with the operation of the process.

In the present invention, the introduction of aqueous nitrogen bases into the vat in no way interferes with the filtration of the vat in case it is desired to employ this operation as an additional means of purification for the removal of inert vat-insoluble matter. When operating with the more volatile members of the series such as pyridine or pyridine bases, the solvent may be recovered in high yield by using closed vessels and pressure filters rather than vacuum filters.

After the crude color is vatted in the presence of the solvent, the mass may be filtered, and the resulting filtrate (or unfiltered vat if desired) may be treated with any known oxidizing agents for precipitating the dye from its vat. Air, oxygen, Sitol (sodium-m-nitrobenzene-sulfonate), sodium perborate, and the like, or mixtures thereof may be used.

When the precipitated dye is filtered off and washed with the solvent of like kind used in vatting the dye (omitting the hydrosulfite) the hydroxy-alkoxy-dibenzanthrone is substantially completely removed as its alkali metal salt. Some inert organic matter may also be removed in the filtration, with the result that dyeings of the purified product are not only enhanced in brilliance, but are usually of increased strength compared with dyeings of the initial crude dyestuff. Increases in strength up to 15% have been noted.

When operating with the more volatile members of the series of solvents, such as the pyridines, the filtrate from the precipitated dye may be subjected to a simple distillation, giving a distillate consisting of an aqueous solution of the base suitable for re-use. If salt is added before distilling, a distillate may be obtained which contains as high as 50% solvent in the case of pyridine bases. If closed equipment is used and care taken that no air sweeps through the containers, recoveries of 95-98% are obtainable. The aqueous residue in the still contains a precipitate very rich in hydroxy-alkoxy-di-benzanthrone which may be filtered off and recovered. On realkylation according to Example 7 of U. S. Patent 2,140,455, crude dialkoxy-dibenzanthrone is obtained, which may be returned to the process.

The effect of temperature on the process appears to be that of increasing the solubility of the impurity with increase in temperature. With the amount of impurities met with in practice, however, ordinary room temperatures of 20-25° C. are usually sufficient to bring about the desired result particularly when pyridine or its homologs are used. The upper temperature limit is limited only by the boiling point of the aqueous solvent mixtures and the economics desired in carrying out the reaction. Temperatures of 50-60° are preferable in practice.

The following examples are given to illustrate the invention. The parts used are by weight.

*Example 1*

16.45 parts of an aqueous filter cake containing 5 parts of technical dimethoxy-dibenzanthrone (prepared according to Example 8 of U. S. P. 2,140,455 at 110° to 115° C.) are slurried in 66.5 parts of water and 47 parts of pyridine in a closed vessel fitted with a reflux condenser. Five parts of caustic soda and 5 parts of sodium hydrosulfite are added and the temperature is raised to 60° C. and held at 60-65° C. until reduction is complete. 6.75 parts of sodium perborate are added and the mixture is stirred at 60-65° C. until a test under the microscope shows complete separation of green crystals with no blue vat. Additional perborate is added if necessary to complete the oxidation. The mass is heated to the boil under reflux. It is cooled to 60° C. and filtered in a closed pressure filter. The filter cake is washed with 62.5 parts of 37.5% aqueous pyridine, containing 0.625 part of caustic soda, then with water until alkali-free. The purified product thus obtained yields dyeings appreciably brighter and stronger than those of the initial material.

*Example 2*

125 parts of a milled aqueous paste containing 25 parts of a technical grade of dimethoxy-dibenzanthrone, (obtained according to U. S. Patent 2,140,455 and methylated at 110–115°) are slurried in a mixture of 291 parts of water with 234 parts of pyridine bases (boiling range 126–147° C.) and 20.7 parts of caustic soda. The air in the vessel is swept out with nitrogen, and 8.7 parts of sodium hydrosulfide (90%) and 5 parts of diatomaceous earth are added. The temperature is raised to 65° C. and held with agitation until vatting is complete. The charge is then filtered, under nitrogen pressure in a closed heated filter, and the filter cake is washed with a mixture of 112.5 parts of pyridine bases, 187.5 parts of water, 2 parts of caustic soda and 2 parts of sodium hydrosulfite. To the filtrate are added 3 parts of Sitol (sodium-m-nitrobenzenesulfonate) and the mixture is stirred in a closed vessel at 50-60° C. until precipitation of the dye is complete. The mixture is filtered in a closed filter and washed with a mixture of 112.5 parts of pyridine bases, 187.5 parts of water and 3 parts of caustic soda. The filter cake is then washed free of alkali with water and is standardized for use in the usual manner. The product so obtained dyes cotton from the usual hydrosulfite vat in noticeably yellower, brighter and stronger shades than the initial material. The filtrate and wash may be combined and distilled until just free from pyridine bases. The residue is rich in hydroxy - methoxy - dibenzanthrone which gives crude dimethoxy-dibenzanthrone when methylated according to U. S. Patent 2,140,455, Example 7.

*Example 3*

A mixture of 16.45 parts of an aqueous paste containing 5 parts of crude dimethoxy-dibenzanthrone, of the type employed in Example 1, 47 parts of alpha-amino-pyridine, 66.5 parts of water, 5 parts of caustic soda and 5 parts of sodium hydrosulfite, are heated together to 60° C. The mixture is stirred at 60-65° C. until vatting has taken place, and then 2.35 parts of Sitol are added. The mixture is stirred at 60-65° C. until oxidation is complete, which is shown by the disappearance of the blue vat. The mass separates into two layers, an upper one rich in water, and a lower one rich in amino-pyridine, dimethoxy-dibenzanthrone in suspension and hydroxy-methoxy-dibenzanthrone in solution as its sodium salt. The mixture is filtered hot and washed with 37.5% aqueous solution of alpha amino-pyridine containing 1% caustic soda. The filter cake is washed free from solvent and alkali with hot water. The product shows substantially the same improvement obtained in the preceding examples. On acidification, the filtrate yields a precipitate of crude hydroxy-methoxy-dibenzanthrone.

*Example 4*

136 parts of aqueous paste containing 10 parts of dimethoxy-dibenzanthrone of the type employed in Example 1 are stirred with 93.7 parts of piperidine, 30 parts of water and 10 parts of caustic soda. The temperature is raised to 60° C. and 10 parts of sodium hydrosulfite are added and the mass is stirred at 60-65° C. until vatting has occurred. 4.7 parts of Sitol are added and the mass is heated to the boil under reflux. The mass is cooled to 60° C. and is filtered and washed with 125 parts of 37.5% aqueous piperidine containing 1% caustic soda. The filter cake is washed alkali-free with water, and the purified product, which is then standardized for use, shows improvement similar to that obtained in the preceding examples.

*Example 5*

82.25 parts of aqueous paste containing 25 parts of dimethoxy-dibenzanthrone of the type employed in Example 1 are digested with 235 parts of 2-amino-4-methyl-thiazole, 335 parts of water, 25 parts of caustic soda and 25 parts of sodium hydrosulfite. The temperature is raised to 60-65° C. and when vatting has taken place, 12 parts of Sitol are added. The mass is heated to 100° C. and after partial cooling, it is filtered and washed with 320 parts of 37.5% 2-amino-4-methyl-thiazole aqueous solution containing 1% of caustic soda. The dark colored filtrate on acidification yields an impurity containing hydroxy-methoxy-dibenzanthrone. Dyeings of the main portion show increased purity of dyeing as compared with the original product.

*Example 6*

Six parts of crude dimethoxy-dibenzanthrone of the type employed in Example 1 are suspended in a mixture of 50 parts N:N':N''-triethyl-sym-hexahydro-triazine, 83 parts of water and 5 parts of caustic soda. The mixture is heated to 60° C. and 5 parts of sodium hydrosulfite is added. When vatting has taken place 2.2 parts of Sitol dissolved in 10 parts of water are added at 60° C. during a period of about one hour. The mass is then further stirred at 60-65° C. until oxidation is complete. The crystals of dimethoxy-dibenzanthrone are filtered off and washed with a 37.5% aqueous solution of the solvent and then with water until alkali-free. The product is characterized by the same enhancement of shade as in the preceding examples.

*Example 7*

105 parts of an aqueous cake containing 25 parts of brominated dimethoxy-dibenzanthrone (see Example 2, U. S. Patent 2,068,350) are digested in 545 parts of 43.0% aqueous pyridine bases with 25 parts of caustic soda. The temperature is raised to 60° C., 25 parts of sodium hydrosulfite are added, and when vatting is complete, 11 parts of Sitol dissolved in 50 parts of water are added during 2 hours at 60° C. The resulting precipitate is filtered and washed with 312 parts of 37.5% aqueous pyridine bases containing 3.12 parts of caustic soda. The cake is then washed alkali-free with water. Distillation of the filtrate leaves a residue of partially demethylated material.

*Example 8*

Crude diethoxy-dibenzanthrone is obtained according to Example 3 of U. S. Patent 2,140,445. The crude product is vatted in known manner and the vat is filtered to remove unvattable impurities. The filtrate is aerated and the precipitated dye is filtered and washed. 83 parts of this filter cake, containing 10.5 parts of dye, are digested in 183 parts of water and 150 parts of pyridine. 16 parts of caustic soda and 16 parts of sodium hydrosulfite are added and the temperature is raised to 60° C. and is held at 60-65° C. until vatting is complete. 7.5 parts of Sitol are added. The mass is heated to the boil under reflux, cooled to 60° C. filtered and washed with 200 parts of 37.5% aqueous pyridine containing 2 parts of caustic soda. The filter cake is finally washed alkali-free with water. The product so obtained gives dyeings appreciably yellower, brighter and stronger than those of the crude initial material.

*Example 9*

100 parts of aqueous cake containing 16.9 parts of the ethylene ether of dihydroxy-dibenzanthrone (see U. S. Patent 1,761,624) are suspended in 335 parts of 47.6% aqueous pyridine bases with 16.9 parts of caustic soda. The temperature is raised to 60° C. and 16.9 parts of sodium hydrosulfite are added. When vatting has taken place 7.5 parts of Sitol dissolved in 35 parts of water are added during a period of 2 hours at 60° C. The mixture is stirred at 60° C. until oxidation is complete. The mass is filtered and the filter cake is washed with 210 parts of 37.5% aqueous pyridine bases containing 2.1 parts of caustic soda. After washing alkali-free with water, the filter cake may be standardized for use in known manner. It gives dyeings appreciably brighter than those of the initial material.

*Example 10*

The diisopropyl ether of dihydroxy-dibenzanthrone (of Example 3 of U. S. Patent 1,940,419) is treated as in Example 9. A corresponding increase in purity is obtained.

If the blue dyestuff of Example 2, U. S. Patent 2,218,663, and the green dyestuff of Example 2 of U. S. P. 2,318,266 are treated as in the above example, similar increases in purity of the resulting products are obtained.

In this purification process potash may be employed in place of the caustic soda with substantially the same results.

Other heterocyclic nitrogen bases may of course be substituted for those specifically mentioned in the examples, such as alpha-, beta-, or gamma-picoline, 2:6-lutidine, hexamethylene imine, alpha-pipecoline, or any of the other heterocyclic bases which do not form hydrates under the conditions of the reaction.

Air, oxygen, or any other form of oxidizing agent normally employed in precipitating the vatted dye from solution may be used. Where air or oxygen are employed with highly volatile heterocyclic bases, necessary precautions must be employed to prevent loss of such solvent.

In the specification and claims the expressions dialkylated-, or completely alkylated dihydroxydibenzanthrones, or dialkoxydibenzanthrones, are used interchangeably to cover those alkylation derivatives in which both hydroxyl groups of the dihydroxydibenzanthrone are alkylated, either with the same or different alkyl groups. This includes those in which it is theorized that one alkyl group may be attached to the two hydroxy radicals such as are employed in some of the examples which are given to illustrate, but are not to be construed as limitations upon, the invention.

I claim:

1. In the process of purifying alkylated dihydroxydibenzanthrones in which the hydroxyl groups are completely alkylated by removal therefrom of any incompletely alkylated hydroxy derivatives that may be present therein, the steps which comprise extracting the impure product with an aqueous solution of a caustic alkali and a heterocyclic nitrogen base, and filtering off the solution containing the dissolved impurities, the caustic alkali being present in an amount sufficient to form the alkali metal salt of the free hydroxy compounds, and the nitrogen base being employed in an amount sufficient to dissolve the alkali metal salts of the free hydroxy compounds formed in said solution.

2. In the process of purifying alkylated dihydroxydibenzanthrones in which the hydroxyl groups are completely alkylated by removal therefrom of any incompletely alkylated hydroxy-derivatives that may be present therein, the steps which comprise extracting the impure product with an aqueous solution of a caustic alkali and a heterocyclic nitrogen base, and filtering off the solution containing the dissolved impurities, the caustic alkali being present in an amount sufficient to form the alkali metal salt of the free hydroxy compounds, and the nitrogen base being employed in an amount equal to at least about 25 to 30% of the water used.

3. In the process of purifying alkylated dihydroxydibenzanthrones in which the hydroxyl groups are completely alkylated by removal therefrom of any incompletely alkylated hydroxy-derivatives that may be present therein, the steps which comprise vatting the impure alkylated dihydroxydibenzanthrone in an aqueous caustic alkali solution containing a heterocyclic nitrogen base, oxidizing the vatted compound and filtering off the resulting solution containing the dissolved impurities, the caustic alkali being present in an amount sufficient to form the alkali metal salt of the free hydroxy compounds, and the nitrogen base being employed in an amount equal to at least about 25 to 30% of the water used.

4. In the process of purifying alkylated dihydroxydibenzanthrones in which the hydroxyl groups are completely alkylated by removal therefrom of any incompletely alkylated hydroxy-derivatives that may be present therein, the steps which comprise vatting the impure alkylated dihydroxydibenzanthrone in a caustic alkali-hydrosulfite vat containing a heterocyclic nitrogen base, oxidizing the resulting vat and filtering off the solution containing the dissolved impurities, the caustic alkali being present in an amount sufficient to form the alkali metal salt of the free hydroxy compounds, and the nitrogen base being employed in an amount equal to at least about 25 to 30% of the water used.

5. In the process for purifying alkylated dihydroxydibenzanthrones in which the hydroxyl groups are completely alkylated by removal therefrom of any incompletely alkylated hydroxy-derivatives that may be present therein, the steps which comprise extracting the impure product with an aqueous caustic alkali solution of pyridine, the caustic alkali being present in an amount sufficient to form the alkali metal salt of the free hydroxy compounds, and filtering off the resulting solution, the pyridine being present in the solution in an amount equal to at least 25 to 30% of the water used.

6. In the process for purifying alkylated dihydroxydibenzanthrones in which the hydroxyl groups are completely alkylated by removal therefrom of any incompletely alkylated hydroxy-derivatives that may be present therein, the steps which comprise vatting the impure alkylated dihydroxydibenzanthrone in an aqueous caustic alkali solution containing pyridine, oxidizing the resulting vat and filtering off the solution containing the dissolved impurities, the caustic alkali being present in an amount sufficient to form the alkali metal salt of the free hydroxy compounds, and the pyridine being present in the vat in an amount equal to at least 25 to 30% of the water used.

7. In the process for purifying alkylated dihydroxydibenzanthrones in which the hydroxyl groups are completely alkylated by removal therefrom of any incompletely alkylated hydroxy-derivatives that may be present therein, the steps which comprise vatting the impure alkylated dihydroxydibenzanthrane in a caustic alkali-hydrosulfite vat containing pyridine, oxidizing the resulting vat, and filtering off the solution containing the dissolved impurities, the caustic alkali being present in an amount sufficient to form the alkali metal salt of the free hydroxy compounds, and the pyridine being present in the vat in an amount equal to at least 25 to 30% of the water used therein.

8. In the process for purifying $B_{z}2,B_{z}2'$-dimethoxydibenzanthrone the steps which comprise vatting the impure dimethoxydibenzanthrone in a caustic alkali-hydrosulfite vat in the presence of pyridine, oxidizing the resulting vat to precipitate the dimethoxydibenzanthrone and filtering off the resulting solution containing the dissolved impurities, the caustic alkali being present in an amount sufficient to form the alkali metal salt of the free hydroxy compounds, and the pyridine being present in the vat in an amount equal to from 30 to 50% of the water used therein.

ERNEST GEORGE BECKETT.